(No Model.)
G. T. & D. MURRAY.
HARVESTER REEL.
No. 299,247. Patented May 27, 1884.
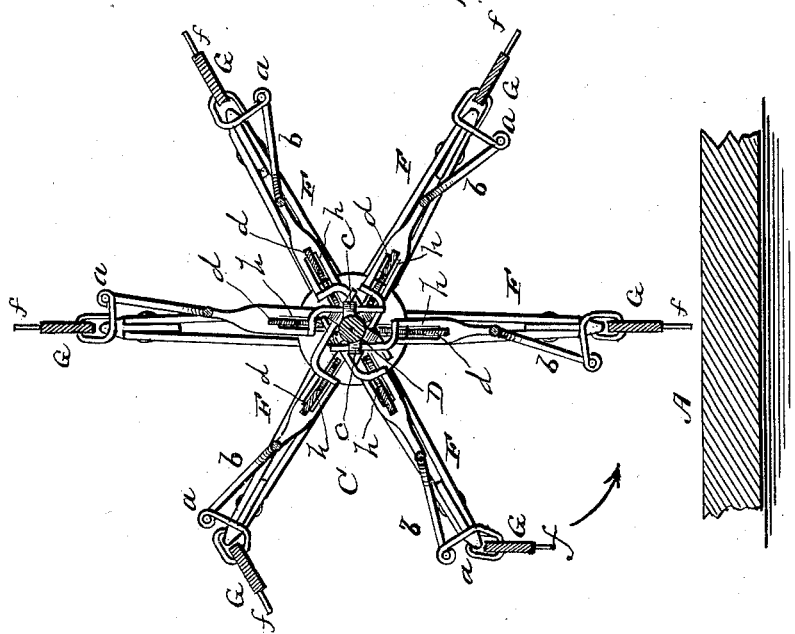
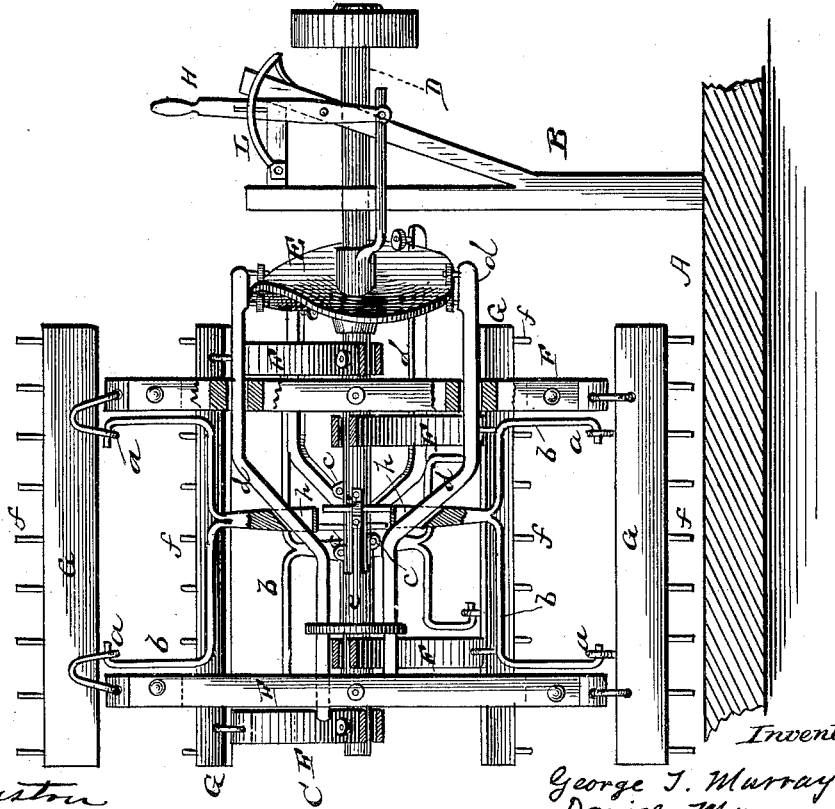
Witnesses:
E. H. Bates
Inventors:
George T. Murray
Daniel Murray
By Edw. J. Underwood
Attorney.

UNITED STATES PATENT OFFICE.

GEORGE T. MURRAY AND DANIEL MURRAY, OF WASECA, MINNESOTA.

HARVESTER-REEL.

SPECIFICATION forming part of Letters Patent No. 299,247, dated May 27, 1884.

Application filed April 20, 1883. (No model.)

*To all whom it may concern:*

Be it known that we, GEORGE T. MURRAY and DANIEL MURRAY, citizens of the United States, residing at Waseca, in the county of Waseca and State of Minnesota, have invented certain new and useful Improvements in Harvester-Reels, of which the following is a specification, reference being had therein to the accompanying drawings.

Our invention relates to improvements in harvester-reels; and it consists in certain details of construction, to be hereinafter more fully described in the specification and set forth in the claims.

The particular objects of our invention are, first, to produce a harvester-reel capable of lifting or taking up all the lodged or fallen grain and presenting it to the cutter; and, secondly, so constructing the reel that the pitch or slope of the rake-heads on the reel-arms may be changed at will, so as to take up fallen grain, whether lying near the ground or far from it; and, lastly, to prevent the cut grain being delivered too far back on the platform. These different objects will be accomplished by the simple but effective mechanism shown in the accompanying drawings, in which—

Figure 1 is a front view of our harvester-reel, showing the standard, shifting cam-wheel, lever, and ratchet; and Fig. 2 is a sectional side elevation of the same.

A is the platform of any description of harvester, (as our device can be attached to an old machine as well as constructed with a new one,) having the standard B, in which is journaled and supported the reel C. This reel consists of the reel-shaft D, which is mounted in bearings in the forked standard B, and provided with the cam or crooked wheel E, for the purpose herein specified. The frame of the reel consists of six or more pairs of arms, F, extending from the shaft down nearly to the platform, and provided with rake-heads G, containing teeth $f$, the rake-heads being hinged to the arms to permit of their being inclined at an angle to said arms as the reel revolves. Near each end of the rake-heads, between the arms, are hooks or eyebolts $a$, which receive the bent ends of the forks $b$, extending from the rake-heads to the reel-shaft D, and the inner ends of these forks $b$ are received in keepers or staples $c$ on the shaft, and move freely in these keepers or staples. The shanks of the forks have slots $h$ near the shaft, through which pass the actuating-rods $d$, which are arranged to move freely in the openings in the sleeve or thimble $e$ on the shaft D, and passing through openings in the inner arms, F, nearest the standard, and having at their inner ends fingers which clasp the sides of the cam-wheel E and impart a reciprocating movement to the said rods. Now, as the rods $d$ are bent in the middle at an angle of about thirty degrees, it follows that as they travel backward and forward the said inclinations will cause the forks $b$ to move up and down in the keepers or staples $c$, and incline the rake-heads on their hinges at a greater or less angle to the arms which support them. The cam is made adjustable upon the shaft by means of a lever, H, arranged to be fastened in any desired position in a lock-bar, L, and as the cam is made to approach the reel or recede from it the pitch or inclination of the rake-heads will be increased or diminished at pleasure, according to the condition of the fallen grain, and when the rake-heads are past the vertical line of the shaft the cut grain will be delivered on the platform as desired. When the ends of the rods $d$ are on that part of the cam at the greatest distance from the reel, the horizontal portion of the said rods will be in the slots in the forks $b$, and the rake-heads will be held in the same plane with the supporting-arms; but as the rods travel along the cam they will force their inclines into the slots and the forks will be lifted, inclining the hinged rake-heads at an angle to the arms, so as to pass under the lodged or fallen grain and raise and deliver it to the cutters; then as the rods travel back along the edge of the cam the rake-heads resume their former position, and the cut grain is delivered on the platform directly in rear of the cutters. Friction-rollers on the fingers at the ends of the rods $d$ work against the edges of the cam, which facilitates the movement; or they may be used only on alternate rods. At the end of the shaft may be seen the usual pulley by which power is to be applied to operate the reel. When the cam is near the standard, only a small portion of the inclined part of the rods $d$ will enter the slots in the forks $b$, and the rake-heads will be but slightly inclined; but when the cam is near the reel the inclination will be very much increased.

Having thus described our invention, what we claim therein as new, and desire to secure by Letters Patent, is—

1. In a harvester-reel, the combination of the hinged rake-heads, adapted to swing at any angle to the arms, with the forks $b$, slotted to receive the rods $d$, which move the rake-heads, and which said rods are provided with friction-rollers at the cam-wheel end, the cam-wheel E, lever H, and lock-bar L, all constructed and operating substantially as described.

2. The combination, with the platform of a harvester, of the standard B, the reel-shaft D, provided with keepers $c$ and sleeve $e$, the cam-wheel E, the rods $d$, having fingers and friction-rollers, the forks $b$, the reel-arms F, and the rake-heads G, provided with teeth $f$, all as described.

3. The combination, in a harvester-reel, as described, of the reel-shaft D, adjustable cam-wheel E, lever H, rods $d$, slotted forks $b$, reel-arms F, and hinged rake-heads G, all substantially as shown and described.

In testimony whereof we affix our signatures in presence of two witnesses.

GEORGE T. MURRAY.
DANIEL MURRAY.

Witnesses:
B. A. LOWELL,
A. C. KRUSSIN.